United States Patent [19]
Molvar

[11] 4,152,259
[45] May 1, 1979

[54] BACKFLUSHING METHOD

[75] Inventor: Allen E. Molvar, Barrington, R.I.

[73] Assignee: Clevepak Corporation, White Plains, N.Y.

[21] Appl. No.: 863,587

[22] Filed: Dec. 22, 1977

[51] Int. Cl.² ............................ B01F 3/04; C02C 5/04
[52] U.S. Cl. .................................. 210/63 R; 210/220; 210/412; 239/119; 261/DIG. 75
[58] Field of Search .................. 134/102, 172, 198; 210/14, 15, 19, 60, 63 R, 194, 220, 221 R, 412; 239/119, 428.5; 261/76, 79 A, DIG. 75

[56] References Cited

U.S. PATENT DOCUMENTS

| | | | |
|---|---|---|---|
| 1,214,152 | 1/1917 | Genter | 210/412 X |
| 1,394,698 | 10/1921 | Trent | 210/7 |
| 1,808,956 | 6/1931 | Ketterer | 261/DIG. 75 |
| 1,874,972 | 8/1932 | Hall | 210/82 X |
| 2,245,952 | 6/1941 | Aitken et al. | 210/82 X |
| 2,479,403 | 8/1949 | Powers | 210/63 R X |
| 2,633,908 | 4/1953 | Brierly | 210/63 R X |
| 3,047,986 | 8/1962 | McKulla, Jr. | 239/119 X |
| 3,671,022 | 6/1972 | Laird et al. | 210/220 X |
| 3,733,263 | 5/1973 | Mandt | 210/7 |
| 3,775,314 | 11/1973 | Beitzel et al. | 210/63 Z |
| 3,897,000 | 7/1975 | Mandt | 210/7 |
| 3,986,932 | 10/1976 | Brushwyler et al. | 210/3 X |
| 4,019,983 | 4/1977 | Mandt | 210/220 X |

FOREIGN PATENT DOCUMENTS 2516371  10/1975  Fed. Rep. of Germany ... 261/DIG. 75

*Primary Examiner*—Robert H. Spitzer
*Attorney, Agent, or Firm*—Cushman, Darby & Cushman

[57] ABSTRACT

An improved method for aerating and mixing waste water which is circulated through a plurality of passages in submerged mixing chambers from an inlet to outlet of each wherein gas is mixed with the water, preferably by forming two parallel streams. To flush debris from the mixing chambers and conduits: (1) each inlet is connected to a location higher than the inlet, and at a lower pressure; (2) circulation of water is stopped; and (3) gas is continued to be forced into the passages to create backward flow of waste water through each chamber from outlet to inlet and thence to the higher location, carrying lodged debris out of the chambers and conduits. Intermittent gas flow creates pulsations which help dislodge debris.

8 Claims, 8 Drawing Figures

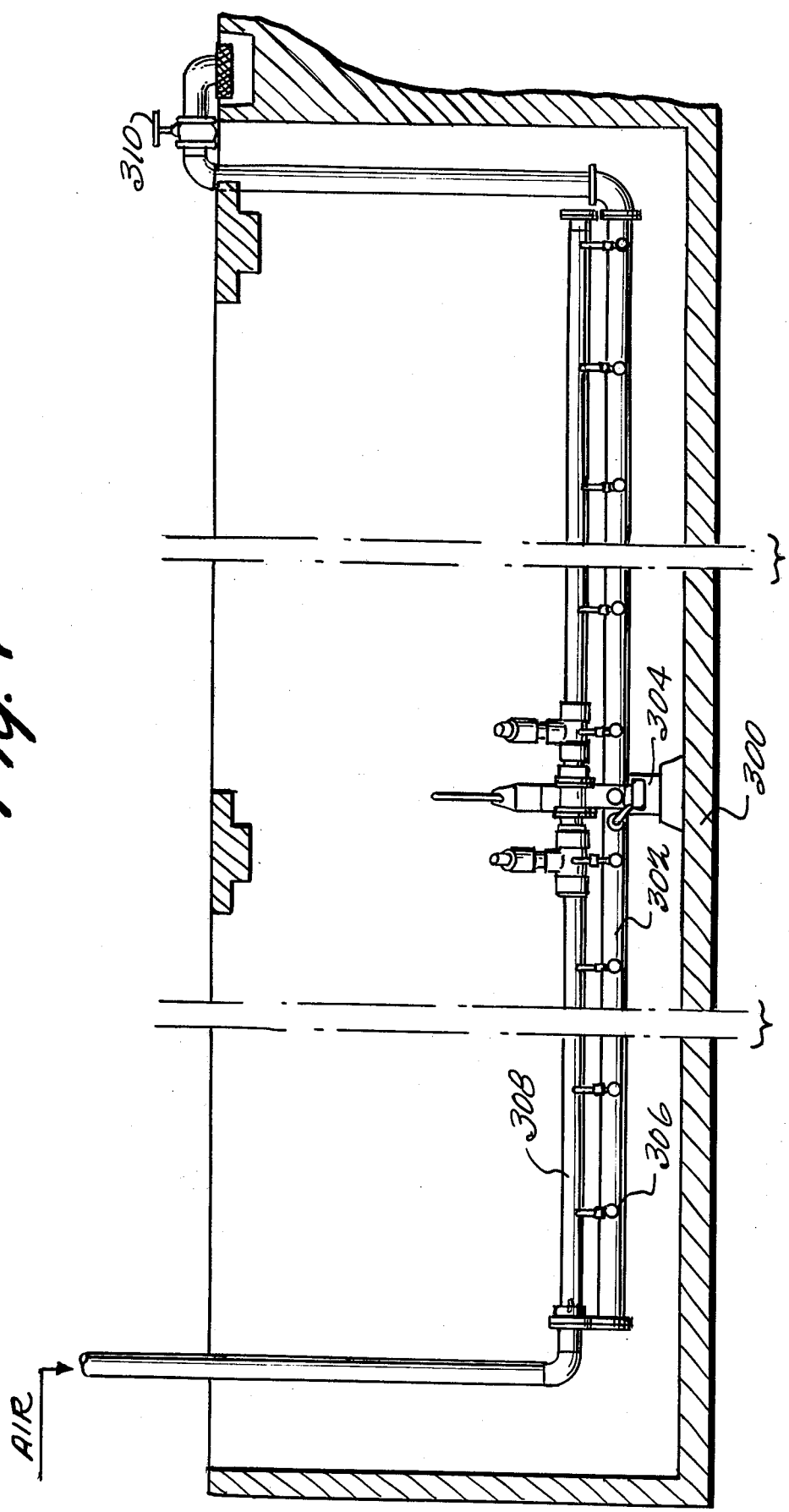

BACKFLUSHING METHOD

BRIEF DESCRIPTION OF THE INVENTION BACKGROUND AND SUMMARY OF THE INVENTION

The invention relates to an improved method utilizing a submerged system for efficiently mixing gas with waste water and for flushing accumulated debris from such submerged system.

Industrial waste, sewage and the like are commonly purified by pumping the liquid into a large tank pond or basin where a bacteria population consumes the inorganic and organic material. Because the dissolved oxygen in the waste water is usually insufficient to support the required population of bacteria, the water must be aerated. This can be done with a surface aerating machine which has beaters extending into the waste water from above the water surface to agitate the water and incorporate air. Alternatively, air can be diffused through the bottom of the basin, e.g., through a porous medium. Surface aerators are not efficient and cause certain mechanical problems. The energy loss of diffusing air is also great and a diffused system is not suitable for installation in an existing pond.

Waste water can also be aerated by pumping through submerged tubes with openings through which air is drawn or pumped into the tubes to create turbulent mixing. Such devices include vortex, jet, Venturi and impingment type devices and are much more energy efficient than diffused or surface aeration systems.

One problem which can arise with systems of this sort in which water and gas are mixed in a chamber is that small particles in an aeration basin or pond can be caught within the mixing chambers, the pump or the conduits therebetween, to eventually clog the same. In sewage treatment, material such as hair, paper, cloth, etc. will become lodged in the chambers, eventually blocking water flow and reducing the effectiveness of the system. Since submerged systems of this type normally pump a great volume of water, even a small number of particles in a large basin will eventually become lodged within the mixing chambers. It is not normally desirable to shut down the system for maintenance, and removal of this material, even when the basin is drained, can be a difficult task.

However, these systems can be flushed of such debris by directly or indirectly connecting the inlets of each of the mixing chambers to which waste water is normally supplied for aeration to a higher, backflush location closer to or above water surface. If the pump is turned off while air continues to flow into the chambers, the difference in pressure between the water at the mixing chambers and the higher location causes flow of the air backward through the inlets to that back-flush location to flush the system. Surprisingly, the air pumps waste water at a substantial flow rate and pressure backward through the system. A separate line can be used with a valve to flush the debris directly above the surface where it can be collected. The waste water can be backflushed through the pump to clean the pump screen provided that the pump and its strainer are mounted above the mixing chambers.

The air can be intermittently turned on and off to create pulsations of water which act as a hammer to dislodge debris.

Other objects and purposes of the invention will be clear from the following detailed description of the drawings.

BRIEF DESCRIPTION OF THE DRAWINGS

FIGS. 7 and 8 show a further embodiment.

DETAILED DESCRIPTION OF THE DRAWINGS

Figure 1:
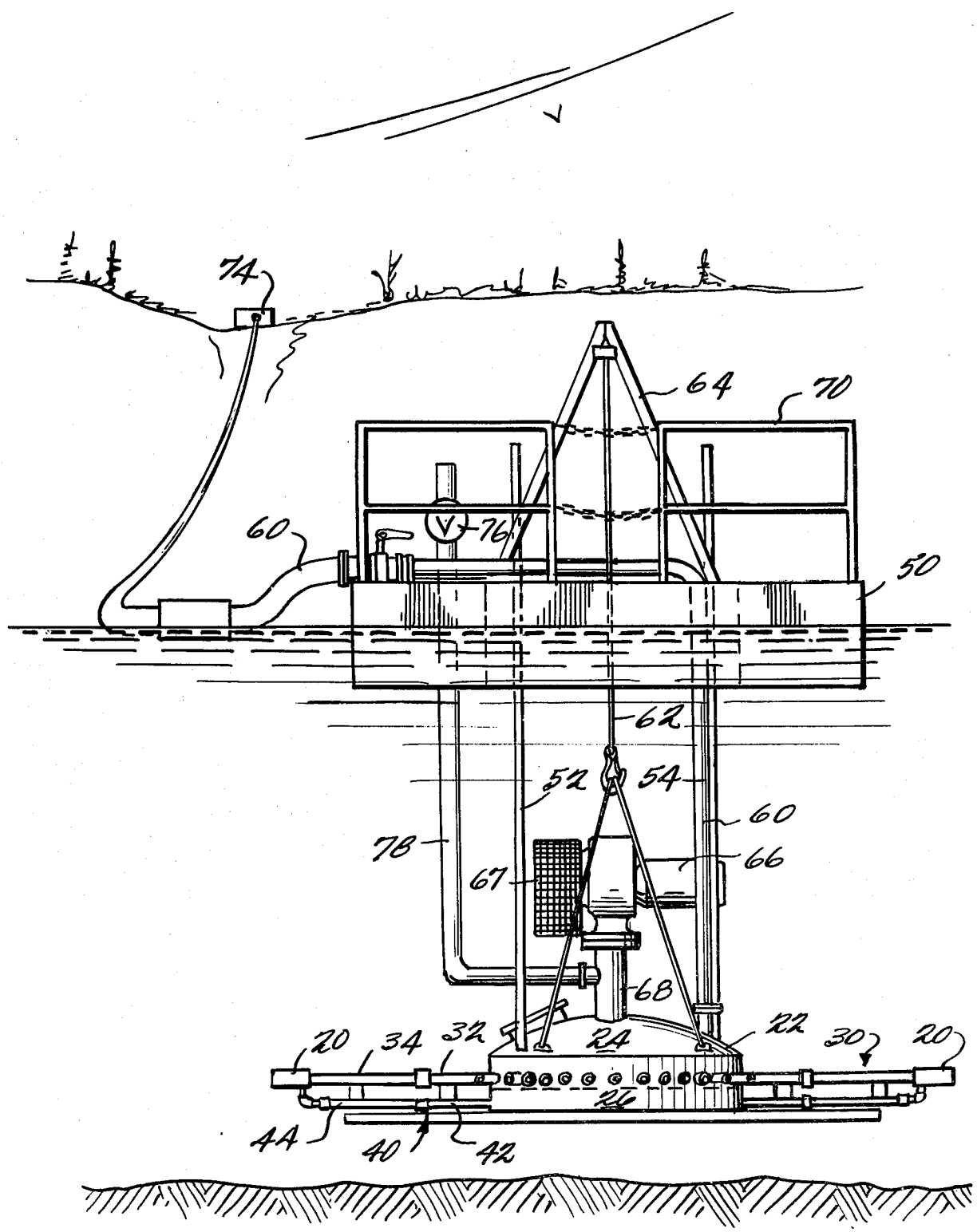
FIG. 1 shows a schematic side view of the system of the present invention in use.
Figure 2:
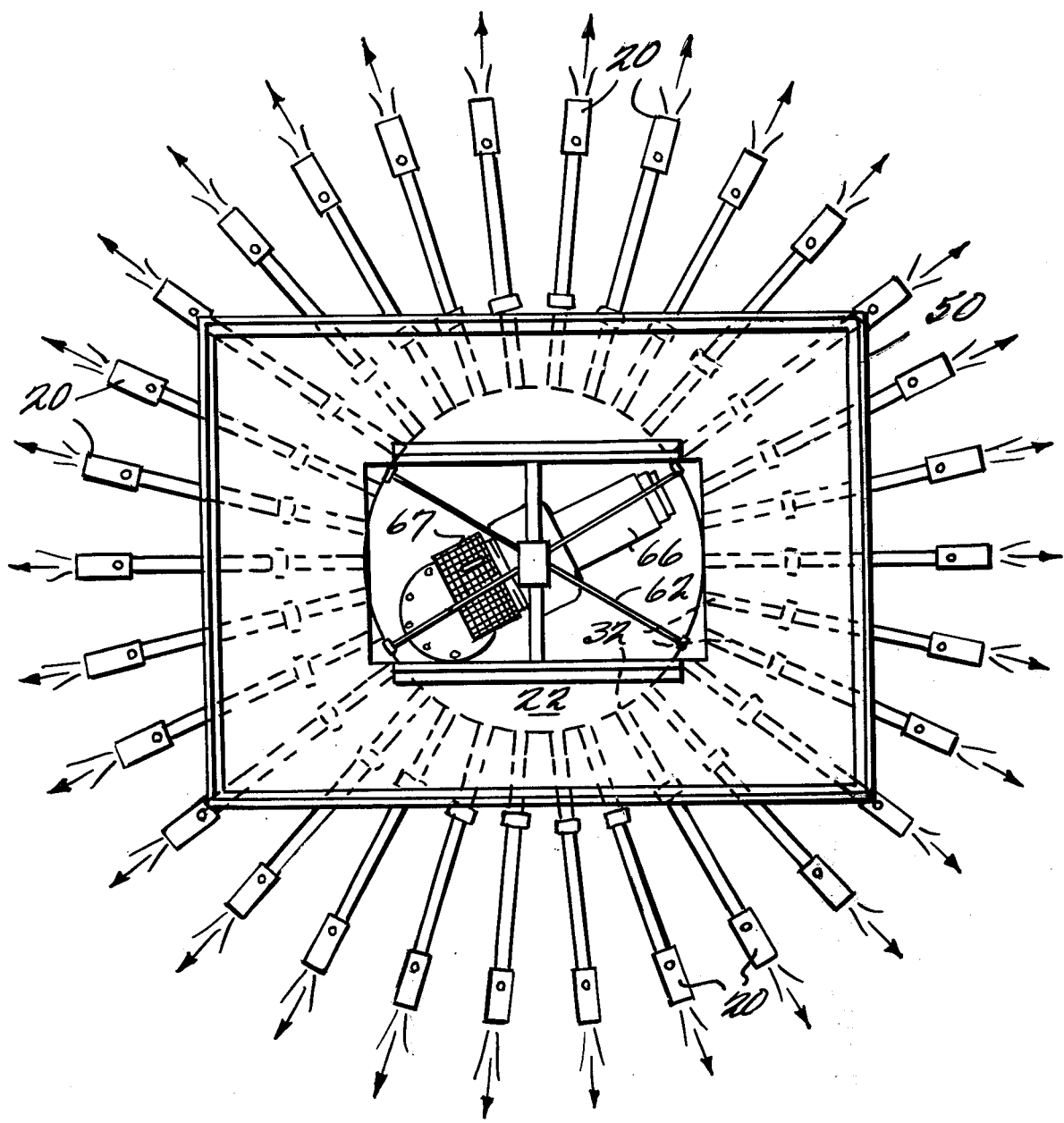
FIG. 2 shows a planar view of the system of FIG. 1.

Reference is now made to FIGS. 1 and 2 which schematically illustrate one embodiment of the present invention. In the embodiment of FIGS. 1 and 2, a plurality of circumferentially disposed mixing chambers or jet aerators 20, each preferably identical to the other, are circularly disposed around a dome manifold 22 which includes an upper section 24 into which water is pumped and a lower section 26 connected to a source of air or oxygen at a suitable pressure. Each of the mixing chambers is of the type shown in detail in FIGS. 3–5 and discussed in detail below.

A plurality of conduits 30, each formed of a metal segment 32 and a plastic segment 34, connect section 24 to each mixing chamber 20 so that water is continuously pumped through each chamber 20. A similar series of conduits 40 formed of a metal portion 42 and a plastic portion 44 also connect section 26 to each of the mixing chambers 20. As will be apparent below, each of the mixing chambers forms parallel streams of air and gas which interact within an extending chamber of the mixing chamber to form tiny bubbles which efficiently mix with the pumped waste water, as it passes between an inlet and outlet. U.S. application Ser. No. 598,871, filed July 24, 1975 describes a system which operates according to this principle.

Manifold 22 is suspended from a fibreglass floating work platform 50 by means of guide bars 52 and 54 and two bars behind them in FIG. 1. Industrial air piping conduit 60 is attached to guide bar 54 for supplying air to section 26. Cable 62 connects the manifold 22 to a frame 64 on platform 50 for lifting manifold 22 and holding manifold 22 in position for maintenance.

A submersible pump 66 is mounted above manifold 22 and includes an optional strainer basket 67 which keeps most debris from entering the pump and being lodged therein. For many installations the basket can be omitted and the debris which collects in the pump backflushed as described below. When a basket is used the small particles which do accumulate on the outside of the basket are removed by backflushing. Conduit 68 connects pump 66 to section 24.

Floating work platform 50 is provided with suitable railings 70 of a height so that the unit can be lifted to a level for convenient work on the mixing chambers and pump. An on-shore air pump 74 is schematically shown as connected to line 60 for pumping air, oxygen or other gas to section 26 for mixing with the pumped waste water.

When it is desired to clean the particles and debris which may accumulate within the pump 66 and the mixing chamber 20, pump 66 can simply be turned off while the air pump 74 continues forcing air into the mixing chambers. However, surprisingly, instead of moving out of the outlet, the air will pump waste water back through the inlet, opposite to the direction of flow during aeration, through conduits 34 and 32 into section 22, through conduit 68 and through pump 66, blowing off the debris which has accumulated on the outside of strainer basket 67. This occurs because the water pressure at the level of the strainer basket is lower than the water pressure at the level of the mixing chambers 20. The outlet points for the back-flushing should be as close to the waterline as possible. Alternatively, flushing can be accomplished by operating a valve 76 in a line 78 which connects to conduit 68. With many pumps, particularly those mounted out of the water, flushing through a separate line is preferable to flushing through the pump. The debris will now be blown into the air and since the pressure differential is greater, the force produced by the air which creates a slugging action will blow the debris through the system and back-flush all of the material in a few minutes. Turning the air on and off repeatedly creates pulsations which will dislodge almost all debris and back-flush it from the system.

Figure 3:
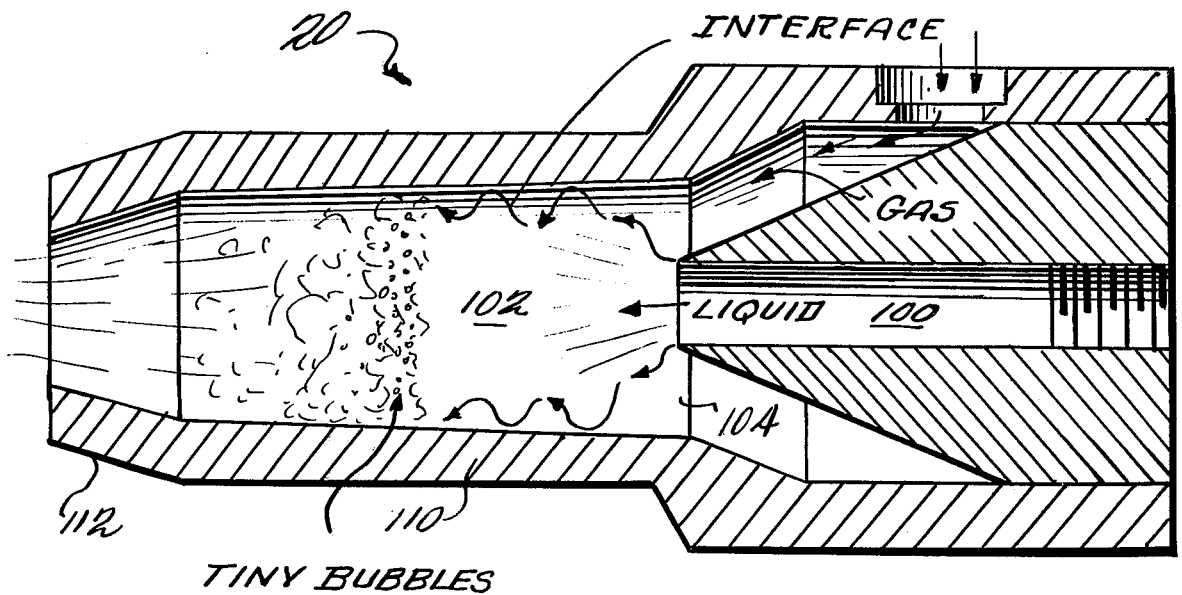
FIG. 3 shows a sectional view of a mixing chamber of the present invention.
Figure 4:
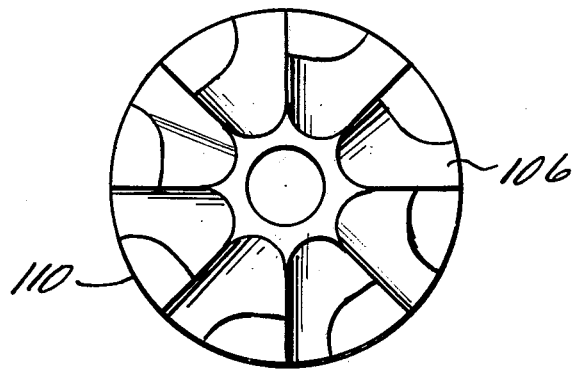
FIG. 4 shows a sectional view of a helical air mixing chamber.
Figure 5:
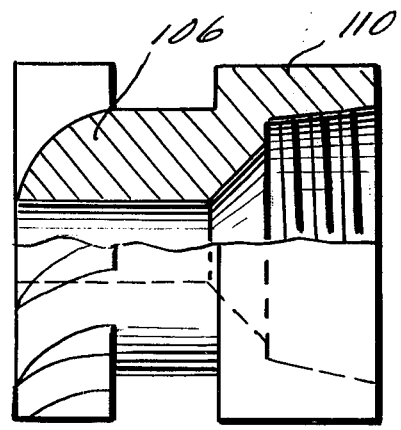
FIG. 5 shows a partial sectional view of the mixing chamber of FIG. 4.

FIGS. 3-5 illustrate a unique mixing chamber 20, particularly useful with the present invention. This mixing chamber is claimed in a co-pending application filed concurrently with the present application, Ser. No. 863,588 filed Dec. 22, 1977. Waste water flows from the inlet through passage 100 into the extending chamber 102. At the intersection between passage 100 and chamber 102, a step surface 104 is provided at which a plurality of passages terminate. To keep the vortices within the chamber 102 at high air pressure, the passages inject the gas at an angle between roughly 11° and 22½°. A chamber with helical vanes in the passages as shown in FIGS. 4 and 5 creates greater wave generating conditions.

Thus, two parallel streams of gas and waste water are created as shown in FIG. 3. As the streams move along the chamber 102, the friction between them causes waves to form and the air thus trapped in waves to disperse into tiny bubbles. Since the air and gas streams move in the same direction, effective mixing is achieved at minimum energy consumption. It is desirable that under most conditions the mixing take place within the chamber 102 and for that reason the chamber is slightly tapered inwardly within the portion 110 with the cross-section decreasing in the direction from inlet to outlet and more radically tapered inwardly within portion 112 at a rate greater than for section 110. These tapers extend the maximum air flow rate with which the system will operate by several times without substantial loss of efficiency.

The helical guide vanes 106 provide a twisting motion to the air and thus create more waves which also help the interface break up more quickly by creating instability.

The mixing chambers can be made of any suitable materials such as stainless steel, aluminum or plastic.

Figure 6:
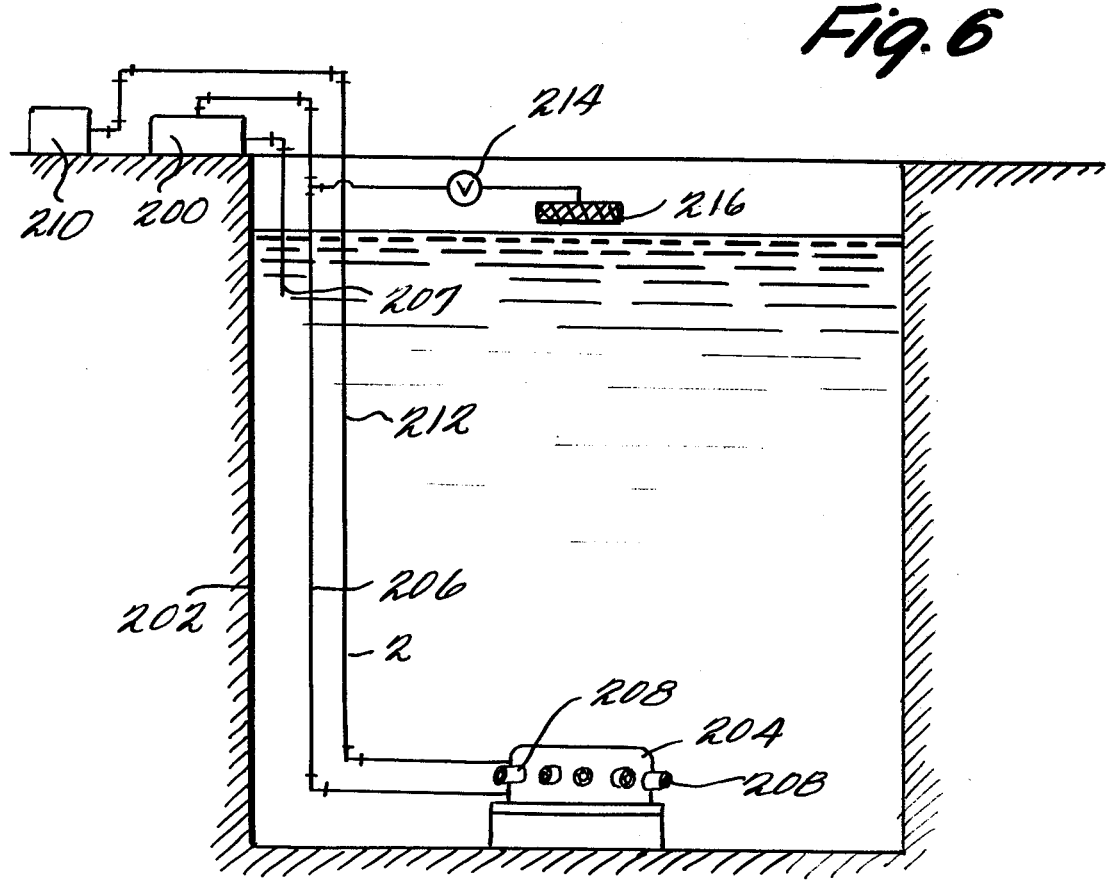
FIG. 6 shows a schematic view of another embodiment.

FIG. 6 shows another embodiment in which the submersible pump is replaced with a conventional waste water pump 200 mounted beside tank 202 and connected to manifold 204 by line 206. Pump 200 has an inlet 207. A plurality of mixing chambers 208 are mounted about manifold 204 and can be any suitable mixing device such as jet, vortex, Venturi or impingement type device. Air pump 210 is also mounted beside tank 202 and is connected to manifold 204 by line 212. Valve 214 can be opened to back-flush waste water as described above while pump 200 is turned off and pump 210 continues to force gas into the mixing chambers 208. The gas then pumps the waste water back through manifold 204 and line 212 where it leaves via valve 214. The waste water returns to the tank and the debris is caught in strainer 216 if desired.

Figure 8:
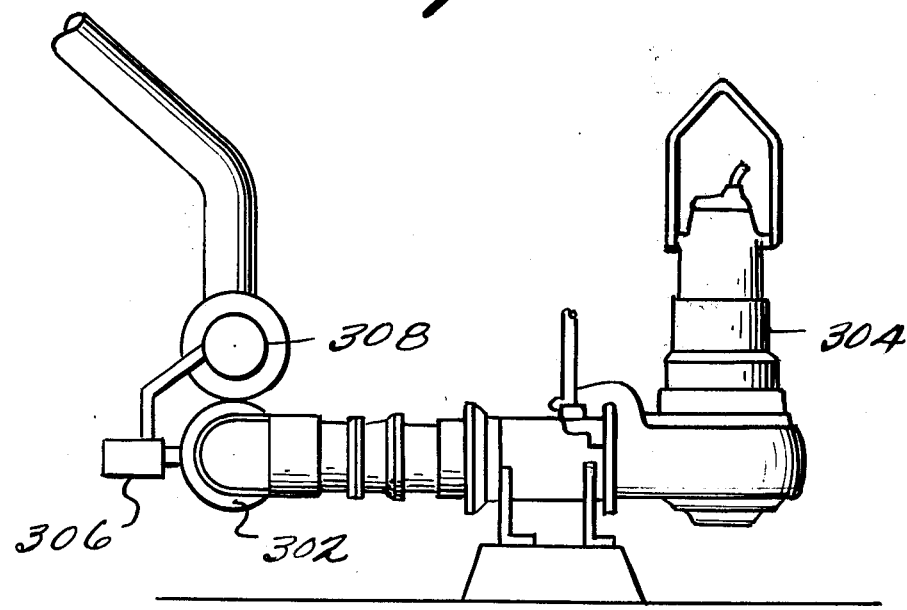

FIGS. 7 and 8 illustrate yet another embodiment of the invention which utilizes mixing chambers as described above. In the arrangement of FIGS. 7 and 8, water in a suitable tank 300 is pumped through a straight line pipe 302 by a pump 304. A plurality of mixing chambers 306 extend outwardly from pipe 302 at separated locations as shown in FIG. 7. Air is supplied to a second pipe 308 which extends above and parallel to pipe 302. Alternatively, one pipe can be within the other. Pipe 308 is connected to the individual mixing chambers for injecting air into those chambers. Pipes 302 and 308 preferably extend along the center of tank 300 parallel to the edges so as to cause a favorable pattern of water flow from one side to the other using a minimum amount of energy to create maximum flow and aeration. The system is flushed by opening valve 310 while pump 304 is turned off and air continued to be supplied to chambers 306.

Many changes and modifications in the above described embodiment of the invention can, of course, be carried out without departing from the scope of the invention. The system can be used with nonaqueous liquids and gas other than air such as pure oxygen can be added. Accordingly, that scope is intended to be limited only by the scope of the appended claims.

What is claimed is:

1. A method of operating a system for mixing a gas with waste water in a body of waste water comprising the steps of:

pumping said water in said body below the surface thereof through at least one passage in a mixing chamber from an inlet to an outlet;

causing gas to enter said passage so the gas and water are mixed in said passage as said water is pumped through said passage; and ceasing said pumping and connecting said inlet to a back-flush location above said outlet without blocking said outlet, said location having a lower pressure than the pressure at said outlet, while continuing to cause gas to enter said passage so that said gas causes backflow of said water from said outlet through said inlet to said lower pressure location to flush debris.

2. A method as in claim 1, in which said step of connecting includes opening a valve in the line between the inlet and a pump which circulates the water.

3. A method as in claim 2, in which said step of opening includes opening said valve above the surface of said water.

4. A method as in claim 1, wherein said step of pumping said water with a pump and said back-flow takes place through the pump and a strainer basket over the pump inlet to remove debris from the outside of said basket.

5. A method as in claim 1, in which the gas contains oxygen.

6. A method as in claim 1, including the further step of intermittently cutting off the flow of gas during backflow to produce pulsations which dislodge debris.

7. A method as in claim 1, wherein said water is circulated through a first pipe extending in a straight line and having said chambers extending outwardly therefrom at separated locations and said causing including supplying the gas through a second pipe extending parallel to said first pipe and connected to said chambers.

8. A method as in claim 1, wherein said pipes extend in the middle of a tank to produce a favorable flow pattern.

* * * * *